United States Patent
Martin

[15] 3,701,502
[45] Oct. 31, 1972

[54] EJECTION SEAT AND MECHANISM THEREFOR

[72] Inventor: James Martin, Southlands Manor, Southlands Road, Denham near Uxbridge, Middlesex, England

[22] Filed: March 19, 1971

[21] Appl. No.: 126,119

[30] Foreign Application Priority Data

April 3, 1970    Great Britain..........16,011/70

[52] U.S. Cl. .....................244/122 AD, 244/122 AE
[51] Int. Cl. ..............................................B64d 25/10
[58] Field of Search .....244/122 AE, 122 A, 122 AB, 244/122 AC, 122 AD, 141

[56] References Cited

UNITED STATES PATENTS 2,502,470   4/1950   Martin.................244/122 AE
2,527,020   10/1950  Martin.................244/122 AE
3,020,011   2/1962   Beem et al...........244/122 AE
3,285,543   11/1966  Koochembere.....244/122 AE Primary Examiner—Milton Buchler
Assistant Examiner—Carl A. Rutledge
Attorney—Kurt Kelman

[57] ABSTRACT

The invention concerns initiator mechanism for ejection seats (and seats provided therewith) such initiator mechanisms being provided for a rocket motor provided on an ejection seat pan which is movable with respect to a seat frame, the initiator being provided on the frame and comprising a pressure fluid source which when initiated in response to withdrawal of a static line stored in a housing on the frame, releases pressure fluid which is transmitted by conduit means to a rocket motor firing pin remote from the source.

11 Claims, 4 Drawing Figures

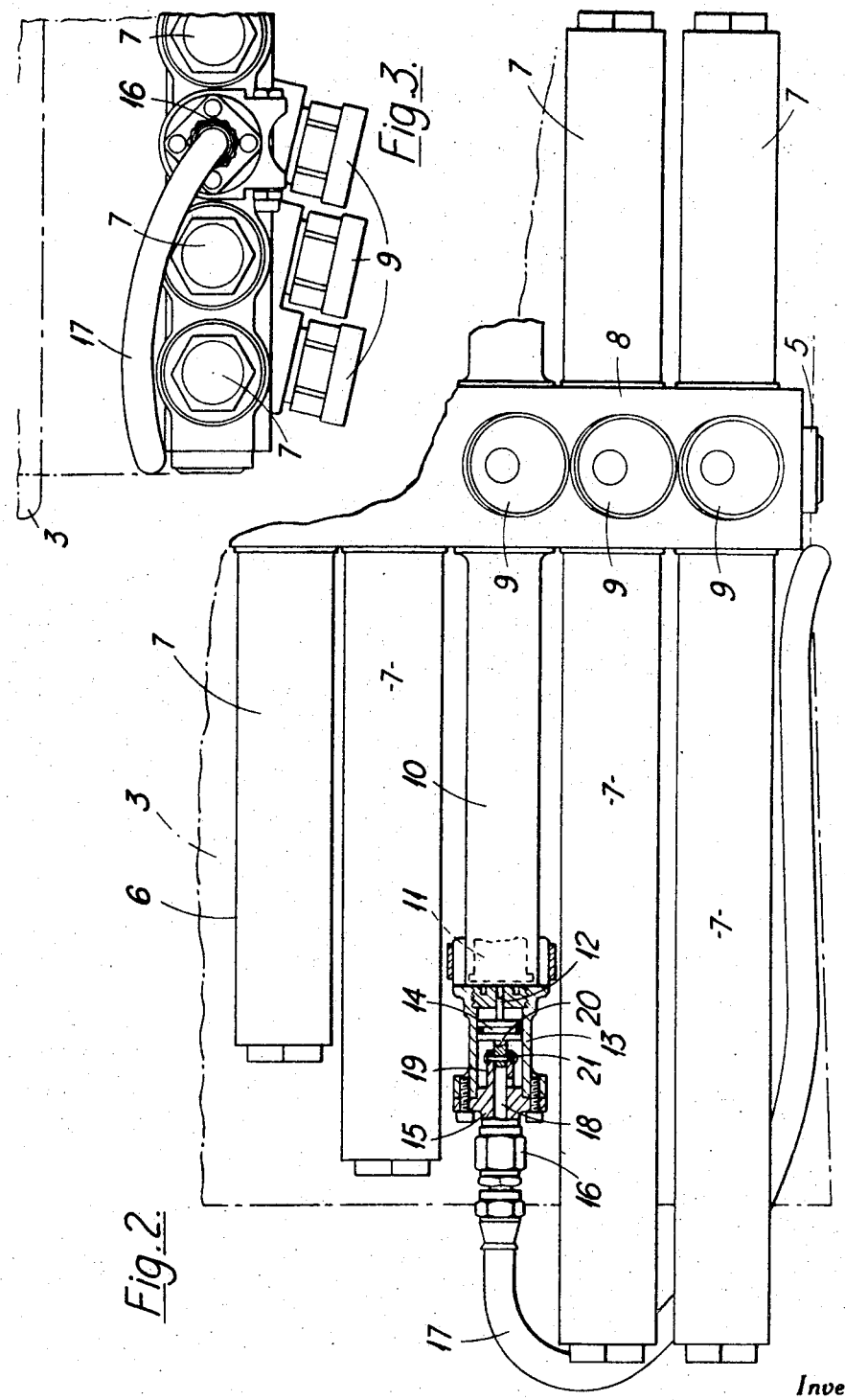

Inventor
JAMES MARTIN

By Kurt Kelman
AGENT

EJECTION SEAT AND MECHANISM THEREFOR

This invention concerns ejection seats.

Many ejection seats comprise a seat frame carrying a seat pan movable with respect to the frame and an intertelescoped tubular ejection gun is provided on the frame to eject the seat from the vehicle in which it is positioned. Such vehicle is usually an aircraft although ejection seats could be applied to other vehicles such as space craft, helicopters and even water craft and road vehicles, all hereinafter referred to, for the sake of convenience, as "aircraft."

Recently ejection seats have also been provided with a second power source for assisting in the ejection of the seat from the aircraft in addition to said gun, this second source being in the form of a rocket motor. The purpose of incorporating a rocket motor in ejection seats was to increase the height of the ejection trajectory without it being necessary to increase the thrust of the ejection gun (which acts for only a short period of time) to an extent in which the person seated in the seat would be subjected to intolerably high acceleration forces.

An ejection seat of the kind referred to above provided with a rocket motor is described in a number of my patents such as for example my U.S. Pat. Nos. 3,503,571; 3,437,294; 3,437,293; and 3,186,662; and U.S. application Ser. No. 708,201.

In such ejection seats the firing of the rocket motor is effected at a time after initial movement of the seat has taken place (under the influence of an ejection gun) by means of a lanyard or static line extending between the floor of the aircraft and the rocket motor pack, a portion of the line being coiled on a former as described in my U.S. Pat. No. 3,508,644.

For various reasons (described in my earlier patents) it has been found to be particularly advantageous to mount the ejection seat rocket motor beneath the pan of the ejection seat rather than on the seat frame. It will be appreciated that the seat pan is movable with respect to the seat frame so that persons of differing builds can be seated comfortably in the seat with respect to their aircraft controls.

It will be understood therefore that if a lanyard of a constant standard length is utilized to extend between the floor of the aircraft and the rocket motor, the rocket motor will be initiated at slightly different times during the ejection sequence if the seat pan is not positioned in a single predetermined position relative to the seat frame. If the seat pan is positioned above any such predetermined position, for example, if the seat is being used by a person of short stature, then the lanyard will become taut and become effective prematurely. The reverse situation arises if the seat pan is set below any such predetermined position.

Whilst it has not been apparent, in practice, that such variations have caused any serious deterioration in the ejection seat performance it is naturally desirable that the performance of ejection seats should be progressively improved in all respects (however minor) bearing in mind that whenever an ejection seat is used the user's life is at stake.

One object of this invention therefore is to provide means whereby satisfactory ignition of a rocket motor on an ejection seat may be effected at precisely at a predetermined time irrespective of the positioning of the seat pan with respect to the seat frame and further to provide means whereby the mechanism for effecting such ignition of the rocket motor is arranged so that it is not a substantial hinderance to personnel servicing the ejection seat bearing in mind, of course, that one of the standard service requirements of an ejection seat requires removal of the seat pan from the seat frame.

According to this invention there is provided for an ejection seat comprising a seat frame and a seat pan, the seat frame being coupled to a standard ejection gun and the seat being provided with a rocket motor; an initiator mechanism for said rocket motor, such mechanism comprising a pressure fluid-operated firing pin adapted to be connected to a rocket motor initiator (for example, a cartridge) on the seat pan, conduit means for carrying pressure fluid to such pressure fluid-operated firing pin from a pressure fluid source, such source being initiated by mechanical means comprising a lever mounted on the ejection seat frame, such lever being movable with respect thereto in response to withdrawal of a static line coupled thereto, such static line being stored in coiled condition (as herein defined) and having a portion remote from the lever coupled directly or indirectly to a portion of the vehicle in which the seat is positioned, the arrangement being such that on ejection of the seat from the vehicle under the influence of the standard ejection gun provided on the seat frame the coiled portion of the static line is progressively unwound and the line becomes taut the lever is moved in turn causes release of pressure fluid from said source and thus the introduction of pressure fluid into the conduit means with the result that the rocket motor firing pin is operated to initiate the rocket motor initiator thereby causing ignition of the rocket motor.

The term "coiled" is to be construed broadly to include not only helical or spiral configurations but also other configurations such as, for example, a zig-zag formation.

According to another feature of this invention there is provided an ejection seat provided with the aforementioned rocket motor initiator mechanism.

Conveniently said lever may be mounted for movement in a housing which has a hollow portion in which the coiled (as herein defined) portion of the static line is stored, this housing thus constituting a dispenser for the static line as and when ejection of the seat occurs initially as a result of actuation of the standard ejection gun.

Expediently the said lever may be mounted for arcuate movement under the influence of the static line (when the latter becomes taut) which is positively coupled thereto and furthermore the lever may be mechanically connected to a sear which is normally associated with a spring biassed firing pin located in a housing containing the pressure fluid source, such source suitably comprising a gas generating cartridge.

The end portion of the static line remote from the said lever may be connected to a drogue gun release mechanism which is a standard item of equipment on my ejection seats. In this way the necessity for an aircraft manufacturer to provide a special additional coupling point for the static line is obviated.

Said gas generating cartridge housing may be releasably connected to the said conduit means which preferably may comprise, at least in part, an armored flexible conduit extending from the said source which lies to the side of the upper portion of the ejection seat frame, said conduit travelling down the side of ejection seat, then adjacent the ejection seat pan where it terminates at a rocket motor located immediately below the ejection seat pan. Such rocket motor may conveniently comprise a plurality of canisters containing rocket propellant, one of these canisters containing an initiating cartridge adapted to be fired by said pressure fluid operated firing pin.

A releasable connection between the pressure fluid source and said conduit is desirably provided to enable ready disconnection of such conduit from the source when it is desired to disconnect the seat pan assembly from the seat frame during servicing of the seat.

In order that the invention may be more readily understood, and further features of the same more readily appreciated, one embodiment of mechanism in accordance with this invention as applied to an aircraft ejection seat (provided with a rocket motor) will now be described by way of example and with reference to the accompanying drawings in which:

FIG. 2 is a fragmentary, partly sectioned, underneath plan view of a rocket motor pack positioned beneath the seat pan of the ejection seat;

FIG. 3 is a fragmentary front elevation of the pack of FIG. 2; and

Figure 1:
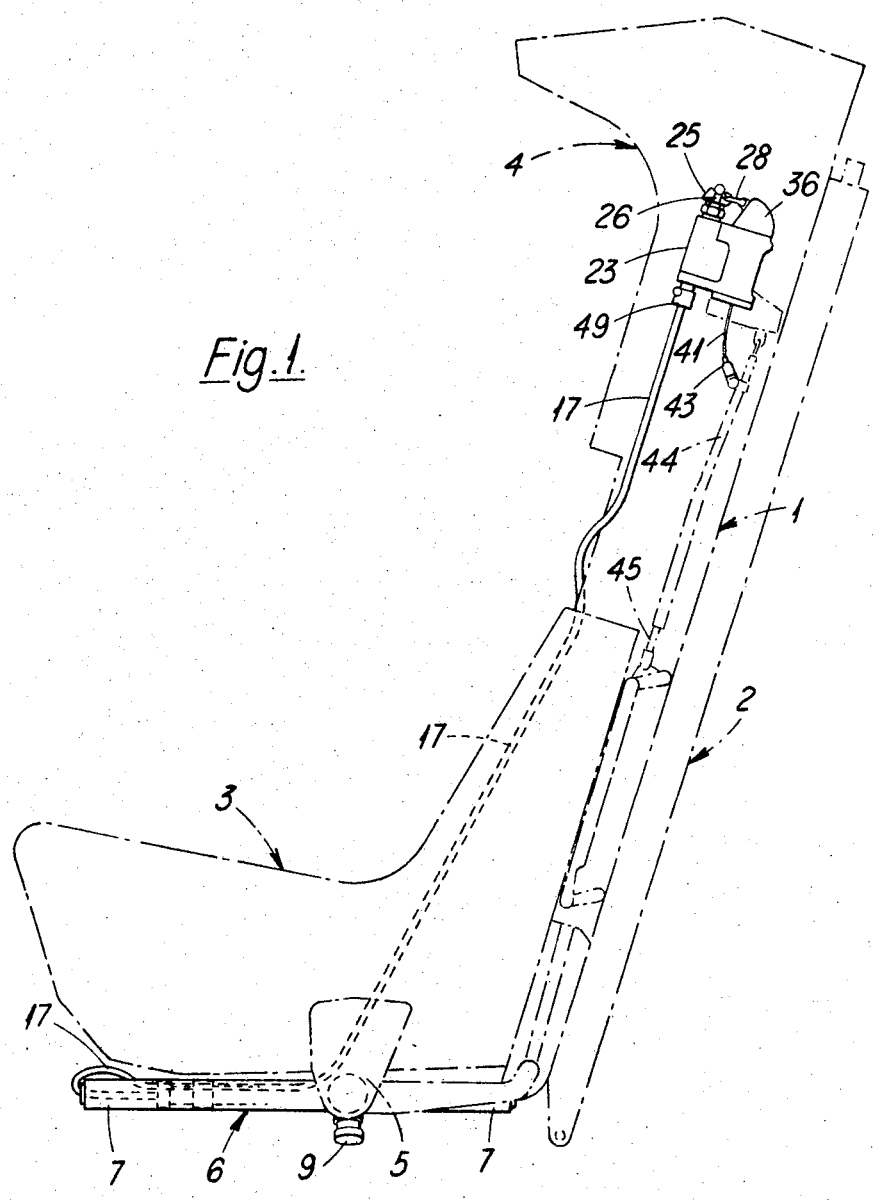
FIG. 1 is a diagrammatic side elevational view of an ejection seat.
Figure 4:
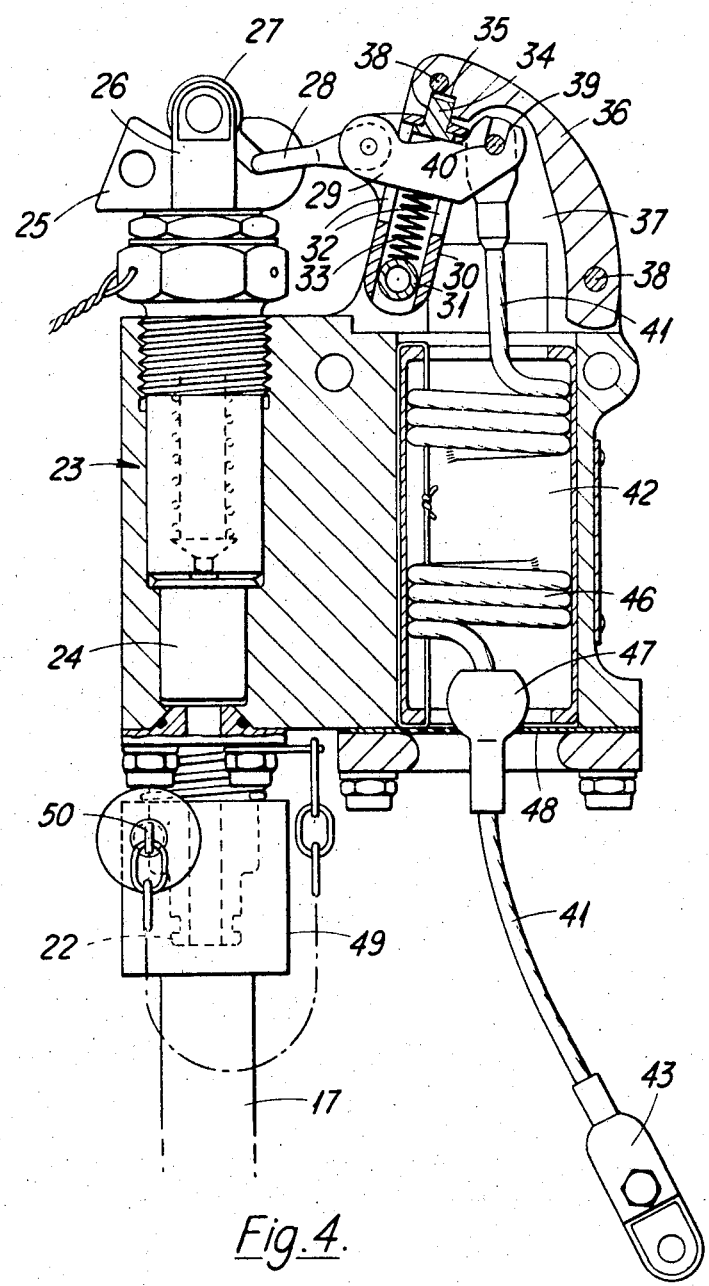
FIG. 4 is a sectional view through a static line housing, pressure fluid source and pressure fluid releasing mechanism.

In this embodiment the ejection seat diagrammatically shown in FIGS. 1 comprises a seat frame formed basically by a pair of spaced apart parallel main beams 1 embracing therebetween an ejection gun 2 and these main beams serve to support a seat pan 3 which is movable along the beams 1 so that the seating position of an airman seated in the seat pan 3 may be altered with respect to the seat frame and head rest 4 and thus with respect to the controls of the aircraft in which the seat is provided. Such seat pan 3 carries therebeneath (pivotally on brackets 5) a rocket motor pack 6 comprising a plurality of propellant cylinders 7 secured to a spine 8 having the outwardly divergent outlet nozzles 9 of the rocket motor pack 6.

One of the canisters (designated 10) of the rocket motor pack 6 contains an initiating cartridge 11 which once fired ignites the contents of canister 10 which results in the discharge of ignited gases into the spine 8 of the pack with the result that ignition of the propellant in all of the canisters 7 of the pack occurs.

The cartridge 11 is fired by means of a firing pin 12 housed in a separately formed body 13 of hollow, generally cylindrical, form, the pin 12 projecting from a piston 14 adapted to ride along the cylindrical body 13 from an inoperative to an operative position in engagement with cartridge 11, once pressure fluid, above a predetermined pressure, is applied thereto.

The cylindrical body 13 is provided with a captive hollow inlet nozzle body 15 which is adapted to be threadedly and sealingly connected to a threaded collar or nut 16 carried by a conduit 17. The inlet nozzle body 15, which is centrally bored 18, has an inwardly directed cylindrical boss 19 which receives a spigot 20 carried by the piston 14 and this spigot 20 is secured to the boss 19 by means of a transversely extending frangible locking pin 21 passing through the spigot 20 and the walls of the boss 19.

The frangible pin 21 serves to ensure that the firing pin 12 is prevented from movement in a direction towards the initiating cartridge 11 of the rocket motor except after the piston has been subjected to pressure fluid at said pressure in excess of said predetermined value whereupon the pin 21 will fracture and release the piston 14 and thus the pin 12. The exact mode of operation of this piston 14 and firing pin 12 will be described hereinafter.

As stated hereinbefore the inlet nozzle body 15 is fluid tightly connected to the conduit 17. This conduit 17 is flexible and extends upwardly of the ejection seat along the side thereof towards the head rest 4 where the opposite end is releasably, but sealingly, connected to an outlet nozzle 22 of a pressure fluid source housing 23, such source comprising a gas generating cartridge 24.

The housing contains said gas generating cartridge which has an initiating cap positioned immediately below a firing pin (not shown) which is spring biassed towards a firing position but is prevented from movement (in a known manner) in a firing direction by a sear 25 traversing a slot extending through an extension 26 of such pin, the upper end of the extension 26 being bifurcated to create the slot. The free ends of the bifurcations support a spindle in turn supporting a roller 27 which is adapted to ride along the upper surface of the sear 25 which is of wedge-like form. This sear 25 is shaped so that withdrawal thereof from between the bifurcations of the extension 26 results in movement of the extension 26 in a direction to move the firing pin away from the cartridge 24 so that the spring means biassing the pin towards the cartridge 24 are further stressed so that once the sear 25 is completely removed from between the bifurcations of the extension 26, such extension 26 is released and such extension may move, as may the firing pin, towards the cap of the cartridge 24 constituting the pressure fluid source under the influence of the stressed spring.

Said sear 25 is mechanically coupled to a simple link 28 which is in turn pivotally coupled to a member 29 supported by an arm 30 arcuately movable about a pivot pin 31.

The member 29 and arm 30 together constitute a lever.

The arm 30 is hollow, has side walls slotted at 32, and the arm 30 supports the member 29 as a result of the member 29 passing through said slots 32. The hollow arm 30 houses a helical compression spring 33 which biases the member 29 away from the pin 31 which in turn biases a slidable locking detent 34 (also slidably housed within the hollow arm 30) into a rebate 35 in a wall 36 defining segmentally shaped cavity 37, this wall retained in a fixed position by pins 38.

The end of the member 29, remote from the link 28, is bifurcated and has open notches 39 in which is located a coupling pin 40 on a static line 41 which passes from its connection in the notch 39 through a dispenser housing 42 to a position where the opposite end of the static line 43 is connected to a part of a drogue gun release mechanism 44 (FIG. 1) operated on movement of the seat with respect to the aircraft and coupled to the aircraft adjacent the link 45.

The dispenser housing has a tubular storage volume which serves to house a coiled portion 46 of the static line 41 so that initial movement of an ejection seat with respect to its aircraft merely withdraws the coiled portion 46 from its stored position and thus does not cause immediate tightening of the static line 41. Thus immediate movement of the member 29 and arm 30 does not take place. Means in the form of part spherical collar 47 co-operating with apertured diaphragm 48 are provided (resilient or frangible) to prevent the coiled portion 46 within the said dispenser housing 42 from being too readily withdrawn accidentally from such housing 42.

The conduit 17 is releasably and sealingly connected to the outlet nozzle 22 in any suitable manner (for example by a bayonet coupling) and a coupling is very diagrammatically indicated at 49, a safety pin 50 and chain also being shown.

To ensure that the operation of this embodiment of the invention is fully understood, the steps which occur when the ejection seat is ejected from an aircraft will now be sequentially described.

Initiation of the ejection sequence of an ejection seat is effected by an airman operating one of two or more initiating handles which, amongst other items such as jettisoning of the aircraft cockpit canopy effects the firing of a first cartridge of the telescopic ejection gun 2 carried by the beams 1 of the ejection seat frame. The ejection seat is automatically unlocked from the aircraft and moves out of the aircraft. Initial movement of the seat takes place along guide rails in the aircraft co-operating with slides or rollers on the beams 1 and after a predetermined distance of travel the drogue gun release mechanism of the ejection seat is actuated and the static line 41 is withdrawn progressively (after withdrawal of collar 47 through diaphragm 48) from the housing 42 containing the coiled portion 46 thereof. Once the coiled portion 46 has been fully uncoiled the static line 41 becomes taut and further movement of the ejection seat out of the aircraft is transmitted directly to the member 29. Such movement causes the member to slide downwardly against the action of spring 33, to release detent 34 and thereafter to cause arcuate movement of the arm 30 about pin 31 with the result that the sear 25 co-operating with the gas generating cartridge firing pin extension 26 results first in the firing pin extension being moved against the action of the spring biassing the same towards the cartridge 24 but once the sear is removed from the said extension 26, the extension 26 is permitted to move under the influence of such spring and the firing pin strikes the firing cap of the gas generating cartridge constituting the source of pressure fluid, so that such gas generating cartridge 24 is initiated.

Gas, under high pressure, is discharged from the cartridge 24 into the said flexible conduit 17 and such gas flows speedily down the conduit 17 and enters the inlet nozzle body 15 which houses the spigot 20 of the captive, pressure fluid operated, firing pin 12. When the gas enters the bore 18 of the body 15 its further passage is prevented until a sufficiently high gas pressure is present whereupon the pin 21 keeping the piston 14 carrying the firing pin 12 captive is fractured whereupon a pulse is created which results in the piston 14 moving very rapidly in a direction towards the firing cap of the initiating cartridge 11 for the rocket motor 6. The firing pin is thus forced to strike such cartridge with the result that the rocket propellant in the canister 10 housing such cartridge 11 is ignited and ignition of such propellant causes hot gases to travel from the canister into and along the rocket motor pack spine 8 with the result that the propellant in the other canisters is ignited. The gas resulting from combination of such propellant is discharged through the outlet nozzles 9 and the ejection sequence is continued.

It will be understood that because movement of the ejection seat pan 3 with respect to the ejection seat frame does not affect the position of said static line 41 with respect to the aircraft and the length of the said static line for initiating the rocket motor can be selected so that the rocket motor is ignited at the optimum predetermined time in the ejection sequence irrespective of the position of the seat pan with respect to the frame.

I claim:

1. For an ejection seat comprising a seat frame, and a seat pan, an ejection gun coupled to the seat frame, and a rocket motor;
   an initiator mechanism for said rocket motor, such mechanism comprising;
   a pressure fluid operating firing pin adapted to be connected to a rocket motor initiator on the seat pan;
   conduit means for carrying pressure fluid to such pressure fluid operated firing pin;
   a pressure fluid source coupled to said conduit means;
   mechanical means for initiating said source; said mechanical means comprising:
   a lever mounted on the ejection seat frame;
   a static line; such lever being movable in response to withdrawal of the static line coupled thereto, such static line being stored in a coiled condition (as herein defined);
   a portion remote from the lever coupled to a portion of the vehicle in which the seat is positioned; the arrangement being such that on ejection of the seat from the vehicle under the influence of the standard ejection gun provided on the seat frame the coiled portion of the static line is progressively unwound and once taut the line results in movement of said lever which in turn causes release of pressure fluid from said source and thus the introduction of pressure fluid into the conduit means with the result that the rocket motor firing pin is operated to ignite the rocket motor.

2. A mechanism according to claim 1, wherein a housing in which said lever is mounted, such housing having hollow portion in which the coiled (as herein defined) portion of static line is stored, this housing thus constituting a dispenser for the static line as and when ejection of the seat occurs initially as a result of actuation of the standard ejection gun.

3. A mechanism according to claim 1, wherein said lever is mounted for arcuate movement under the influence of the static line (when the latter becomes taut) which is positively coupled thereto, and
   a sear;

a spring biassed firing pin located in a housing containing the pressure fluid source; such lever being operatively connected to said firing pin.

4. A mechanism according to claim 1, wherein an arcuately movable slotted hollow arm; and
a member passing through the slots in the arm, together constitute said lever;
spring means located in the hollow arm which urge the member in a direction away from the pivot point of the arm;
a locking detent;
said member in conjunction with the spring means urging the locking detent into a lever locking condition, and the said member being positively coupled to said static line.

5. A mechanism according to claim 1, wherein a gas generating cartridge constitutes said source.

6. A mechanism according to claim 1, wherein releasable connector means are provided releasably to connect said pressure fluid source to the conduit.

7. A mechanism according to claim 1, wherein a pin extending from a slidable piston constitutes said pressure fluid operated firing pin said piston being housed in a cylinder constituted by a housing secured to a propellant housing canister of a rocket motor.

8. A mechanism according to claim 7, wherein a frangible pin locks said piston and pin against movement until pressure fluid at a pressure above a predetermined value acts thereupon.

9. For an ejection seat comprising a seat frame, and a seat pan, an ejection gum coupled to the seat frame, and a rocket motor;
an initiator mechanism for said rocket motor, such mechanism comprising:
a pressure fluid operated firing pin comprising a pin and a piston carrying said pin, said pin being adapted to be connected via a cylinder housing to a rocket motor initiator on the seat pan;
a conduit for carrying pressure fluid to said piston;
a pressure fluid source comprising a housing and a ballistic cartridge located in the housing, such housing communicating with said conduit;
a cartridge firing mechanism comprising a spring biassed firing pin;
a lever constituted by an arcuately movable slotted hollow arm and a member passing through the slots in said arm;
a sear for effecting movement of said spring biassed firing pin, such sear being coupled to said member;
a static line coupled to said lever;
spring means located in the hollow arm;
a locking detent urged by said member under the influence of said spring means towards a lever locking position;
pivotal connection means for pivotally connecting the arm to a housing on the seat frame; and
a cavity housing a portion of said static line in a coiled (as herein defined) condition.

10. An ejection seat comprising a seat frame and a seat pan in which the seat frame is coupled to a standard ejection gun and the seat is provided with a rocket motor, said seat including a mechanism in accordance with claim 1.

11. An ejection seat comprising a seat frame and a seat pan in which the seat frame is coupled to a standard ejection gun and the seat is provided with a rocket motor, said seat including a mechanism in accordance with claim 9.

* * * * *